United States Patent
Bach et al.

[11] 3,995,529
[45] Dec. 7, 1976

[54] RESERVE SYSTEM ACTIVATION AND MODULATION FOR HYDRAULIC FEEDBACK BRAKE BOOSTERS

[75] Inventors: Lloyd G. Bach; Stephen M. Buente, both of South Bend, Ind.

[73] Assignee: The Bendix Corporation, South Bend, Ind.

[22] Filed: June 9, 1975

[21] Appl. No.: 585,282

[52] U.S. Cl. .................................. 91/28; 60/404; 60/413; 91/32
[51] Int. Cl.² ...................................... F15B 13/04
[58] Field of Search ............... 91/372, 28, 33, 370, 91/433, 32; 60/413, 404, 548

[56] References Cited
UNITED STATES PATENTS

| | | | |
|---|---|---|---|
| 3,638,528 | 2/1972 | Lewis | 60/413 |
| 3,831,491 | 8/1974 | Thomas | 91/460 |
| 3,838,629 | 10/1974 | Meyers | 91/460 |
| 3,841,095 | 10/1974 | Baker | 60/413 |
| 3,875,748 | 4/1975 | De Hoff | 60/413 |
| 3,889,467 | 6/1975 | Huffman | 60/413 |
| 3,894,390 | 7/1975 | Belart | 91/372 |
| 3,898,808 | 8/1975 | Ewald | 60/413 |
| 3,898,809 | 8/1975 | Baker | 60/413 |

*Primary Examiner*—Martin P. Schwadron
*Assistant Examiner*—Abraham Hershkovitz
*Attorney, Agent, or Firm*—Ken C. Decker; William N. Antonis

[57] ABSTRACT

A hydraulic brake booster is disclosed which is normally actuated by a primary pressure source, but which may be actuated by a secondary pressure source during failure of the primary pressure source. The booster includes a spool valve which controls communication between the primary pressure source and the booster pressure chamber. The spool valve is actuated by a control pressure which is generated by the vehicle operator when a brake application is effected. The control pressure shifts the spool valve to cause the latter to communicate fluid pressure from the primary pressure source into the pressure chamber. A pressure differential responsive piston is responsive to a pressure differential between the control pressure and the pressure communicated into the booster pressure chamber. When the control pressure exceeds the pressure communicated to the booster pressure chamber by some predetermined amount, the differential pressure responsive piston shifts to actuate a valve mechanism to communicate fluid from the secondary pressure source to the booster pressure chamber. Simultaneously, shifting of the differential pressure responsive piston to actuate the valving mechanism also terminates communication between the spool valve and the booster pressure chamber, so that fluid from the secondary pressure source communicated into the booster pressure chamber may not leak through the spool valve.

11 Claims, 1 Drawing Figure

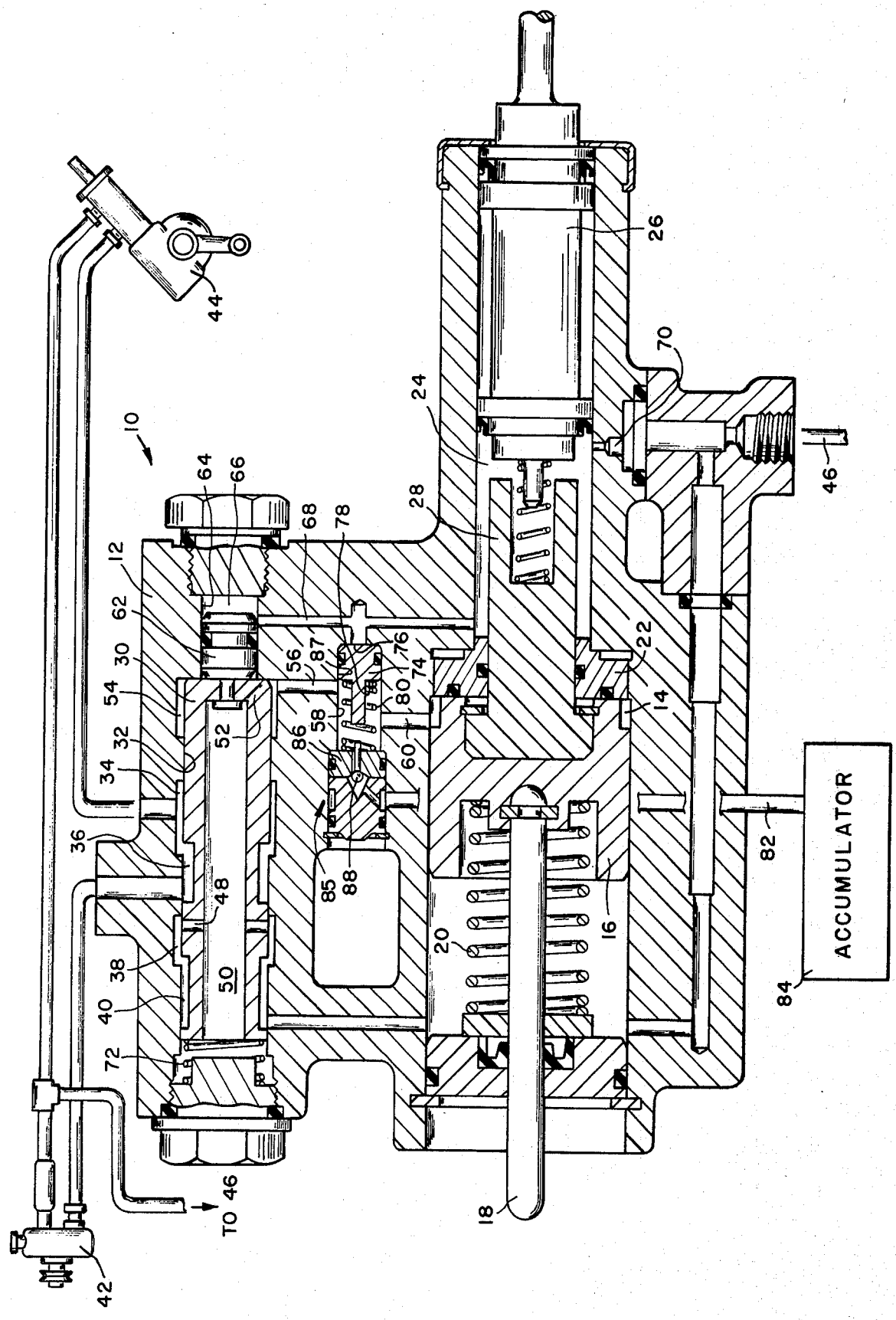

RESERVE SYSTEM ACTIVATION AND MODULATION FOR HYDRAULIC FEEDBACK BRAKE BOOSTERS

BACKGROUND OF THE INVENTION

This invention relates to a hydraulic brake booster provided with an auxiliary or secondary fluid pressure supply.

Many existing hydraulic brake boosters are provided with a secondary pressure source which may be used to actuate the booster during failure of fluid communication to the booster from the primary pressure source. Normally, the secondary pressure source is a fluid pressure accumulator which stores fluid generated during normal actuation of the booster for use during the aforementioned failure of the primary pressure source. Existing brake boosters, such as the boosters disclosed in U.S. Pat. No. 3,638,528 owned by the assignee of the present invention, provide actuation of the secondary brake pressure source upon overtravel of the spool valve. However, since actuation of the secondary pressure source in these boosters is dependent upon travel of the spool valve, the secondary pressure source is not actuated if contamination or other failure of the spool valve prevents it from moving. Furthermore, since the secondary pressure source is normally a fluid pressure accumulator containing a finite amount of fluid pressure, the booster mechanism must be sealed during actuation by the secondary pressure source to prevent fluid pressure from leaking from the booster around the lands of the spool valve to the booster ports.

SUMMARY OF THE INVENTION

Therefore, an important object of our present invention is to provide a mechanism that actuates a hydraulic brake booster by the fluid pressure content of the secondary pressure source during failure of fluid communication into the booster from the primary pressure source during a brake application.

Another important object of our invention is to provide a mechanism for actuating the secondary fluid pressure source which does not require movement of the spool valve which controls communication from the primary pressure source into the booster.

Still another important object of our invention is to provide a mechanism which prevents communication from the booster pressure chamber to the spool valve during actuation of the booster by the secondary pressure source.

Still another important object of our invention is to provide a mechanism which allows modulation of the booster during actuation of the latter by the secondary pressure source; i.e., a mechanism which permits the pressure level in the booster chamber to be increased or decreased during a brake application using the secondary fluid pressure source.

DESCRIPTION OF THE DRAWINGS

The sole FIGURE of the drawings is a transverse cross-sectional view of a brake booster made pursuant to the teachings of our present invention.

DETAILED DESCRIPTION

Referring now to the drawings, a brake booster generally indicated by the numeral 10 includes a housing 12 which defines a pressure chamber 14 therewithin. A boost piston 16 is slidably mounted in the pressure chamber 14 and is provided with a rod 18 which interconnects the piston 16 with a conventional vehicle master cylinder (not shown) which is mounted just to the left of the housing 12 viewing the FIGURE. A spring 20 yieldably urges the piston 16 to the right viewing the FIGURE, so that the rightwardmost face of piston 16 engages the end wall 22 of the pressure chamber 14.

The housing 12 further defines a control chamber 24 therewithin which slidably receives a plunger 26. The plunger 26 is connected to the conventional brake pedal (not shown) mounted in the operator's compartment of the vehicle, so that when a brake application is effected, the plunger 26 is driven to the left, viewing the FIGURE. Control chamber 24 further receives another plunger 28 which is integral with the piston 16 and which extends through the end wall 22 of the pressure chamber 14.

A spool valve generally indicated by the numeral 30 is slidably received within a bore 32 defined within the housing 12, and the outer circumferential surface of the spool valve 30 cooperates with the wall of the bore 32 to define annular grooves 34, 36, 38, and 40. The groove 36 is communicated to the outlet or high pressure side of a conventional power steering pump 42, and the groove 34 is communicated to the inlet or high pressure side of the conventional steering gear 44. The groove 40 is communicated to return port 46 by passages defined within the booster housing, which in turn is communicated to the inlet or low pressure side of the pump 42. The outlet or low pressure side of the gear 44 is also communicated to the inlet of the pump 42. Groove 38 communicates with passages 48, 50, and 52 defined within the spool valve 30. Passage 52 communicates with still another annular groove 54, and a passage 56 communicates the groove 54 to still another bore 58 defined within the housing 12. Still another passage 60 communicates a bore 58 to the pressure chamber 14. Consequently, the fluid pressure level in the groove 38 is normally communicated to the pressure chamber 14 through passages 48, 50, and 52, the annular groove 54, the passage 56, the bore 58, and the passage 60. A piston-like element 62 is secured to the right-hand end of the spool valve 30 and sealingly engages the wall of a reduced diameter portion 64 of the bore 32. The face of the piston 62 cooperates with the end of the portion 64 to define a control cavity 66 therebetween, which is communicated to the control chamber 24 by a passage 68, which also communicates with the bore 58. The control chamber 24 is also communicated with the return port 46 by a compensating port 70. Furthermore, a spring 72 yieldably urges the spool valve 30 to the right, viewing the FIGURE, into the position illustrated in the drawing.

The bore 58 slidably receives a pressure differential responsive piston 74. One face 76 of the piston 74 is exposed to the fluid pressure levels in the passage 68 which communicates with control chamber 24. The opposite face 78 of the piston 74 is exposed to the fluid pressure level in the passage 60, and therefore, to the fluid pressure communicated into the pressure chamber 14. A spring 80 yieldably urges the piston 74 to the right viewing the FIGURE, toward the position illustrated in the drawing. Still another passage 82 communicates the bore 58 to a fluid pressure accumulator illustrated schematically at 84. Accumulator 84 may be of any suitable type well known to those skilled in the art, and is adapted to store fluid under pressure. For example, the accumulator may be made pursuant to the teachings of the accumulator disclosed in co-pending U.S. patent application Ser. No. 444,925, filed Feb. 22, 1974, owned by the assignee of the present invention. Valve elements generally indicated by the numeral 85 are located in the passage 82 and include a valve seat 86 which is sealingly engaged by a valve member 88. Consequently, when the pressure accumulator 84 is greater than the pressure in the bore 58, the valve element 88 will remain sealingly engaged with the valve seat 86, but when the pressure accumulator 84 is greater than the pressure in the bore 58, the higher pressure to the left of the valve member 88 will maintain it sealingly engaged with the valve seat.

MODE OF OPERATION

When a brake application is effected during normal operation of the pump 42 and the spool valve 30, the plunger 26 is urged to the left viewing the FIGURE by operation of the brake pedal by the vehicle operator. As the plunger 26 moves to the left, compensating port 70 is closed, and thereafter fluid pressure is developed in the control chamber 24. This pressure is communicated into the portion 66 of the valve bore 32, and acts on the face of the piston portion 62. When the fluid pressure force acting on the piston portion 62 exceeds the force generated by the spring 72, the spool valve shifts to the left viewing the FIGURE. As the spool valve shifts, the opening communicating the groove 36 with the groove 34 is restricted. Initially, before movement of the spool valve 30, substantially uninhibited fluid communication is permitted through the booster between the grooves 36 and 34, so that the high pressure output of the pump 42 was communicated directly to the inlet of the gear 44 with no appreciable pressure drop. However, as the spool valve 30 shifts to the left, fluid pressure is developed in the groove 36. Simultaneously, movement of the spool valve to the left terminates communication between the groove 38 and the groove 40 and initiates communication between the groove 36 and the groove 38. Therefore, the fluid pressure developed in the groove 36 is communicated into the pressure chamber 14 and bore 58 through the passages 48, 50, 52, the groove 54, and the passages 56 and 60. The fluid pressure in the pressure chamber 14 acts on the piston 16 to urge the latter to the left, viewing the FIGURE, thereby effecting a brake application. It will be noted that the diameter of the plunger 28 is less than the diameter of the plunger 26, to provide a ratio changing effect as described in U.S. Pat. No. 3,831,491, assigned to a foreign affiliate of applicant's assignee.

Although the booster mechanism 10 usually functions satisfactorily as described hereinabove, there are instances when a failure of fluid pressure communication into the pressure chamber 14 may occur when a brake application is effected. For example, if the vehicle's engine dies, the fluid pressure output of the pump 42 terminates immediately. Furthermore, if contaminants in the vehicle hydraulic fluid supply should prevent shifting of the spool valve 30, a brake application using the fluid pressure output of the pump 42 cannot be effected. For that reason, the auxiliary fluid supply or accumulator 84 is provided. During normal actuation of the booster, wherein high pressure fluid is communicated to the bore 58 into the pressure chamber 14, the high pressure fluid in the bore 58 forces the valve element 88 away from the valve seat 86 to permit a portion of the fluid communicated into the bore 58 to communicate through the passage 80 into the accumulator 84. The accumulator 84 stores this fluid under pressure for use when the aforementioned malfunction occurs. In this way, the booster can be actuated using the emergency fluid supply stored in the accumulator 84 even if the spool valve 30 sticks or if the pump 42 terminates operation. When a brake application is effected under these conditions, the high pressure fluid will be generated in the control chamber 24 described hereinabove. However, the failures described above will prevent high pressure fluid from communicating into the bore 58 from the annular groove 52 through the passage 56. Therefore, the pressure acting on face 78 of the piston 74 will be substantially less than the relatively high pressure in the control chamber 24 which acts on the face 76 of the piston 74. Consequently, when this pressure differential overcomes the force of the spring 80, the piston 74 will shift to the left viewing the FIGURE. Movement of the piston 74 to the left urges the valve element 88 away from valve seat 86 to permit fluid to communicate from the accumulator 84 into the pressure chamber 14 through the passage 82, bore 58, and the passage 60. The high pressure fluid in the pressure chamber 14 effects a brake application in the normal manner as described hereinabove.

It will also be noted that, as the piston 74 moves to the left, the outer circumferential surface 87 of the piston 74 will close off communication between the passage 56 before the piston 74 engages the valve element 88. Therefore, when the emergency fluid supply stored in the accumulator 84 is used to actuate the booster, leakage is prevented from the pressure chamber 14 into the passage 56. Consequently, the fluid pressure content of the accumulator 84 is conserved solely to actuate the booster, and no leakage can occur, for example, around the grooves of the spool valve 30 to the ports communicating with the grooves 34 and 36, or to the return port 46. The piston 74 also permits modulation of the fluid pressure communicated into the pressure chamber 14 during an emergency brake application using the emergency supply stored in accumulator 84. For example, should the vehicle operator release the pressure on the foot pedal to some intermediate value, the pressure in the control chamber 24 will be correspondingly reduced, thereby permitting the forces due to the relatively high pressure fluid from the accumulator acting on the face 78 of piston 74 and the force of the spring 80 to urge the piston to the right viewing the FIGURE to permit some of the fluid pressure communicated into the pressure chamber 14 to escape to the return port 46. After the pressure in the pressure chamber 14 has been reduced by the appropriate amount, piston 74 will again return to its position blocking communication through the passage 56. Of course, should the brakes be released completely, the spring 80 and the fluid pressure in the bore 58 will urge the piston 74 to the position illustrated in the drawings, thereby venting the pressure chamber 14 and permitting the return spring 20 to urge the piston into position illustrated in the drawing.

We claim:
1. In a vehicle hydraulic system having primary and secondary pressure sources, a hydraulic booster comprising:
   a housing defining a pressure chamber therewithin;
   a piston slidable in said pressure chamber in response to the fluid pressure level developed in said pressure chamber;

spool valve means shiftably mounted within a first bore in said housing for controlling communication between said primary pressure source and said pressure chamber;

a control chamber within said housing, means responsive to the fluid pressure level in the control chamber to cause shifting of said spool valve means such as to control communication between said primary pressure source and said pressure chamber;

operator-actuated means for developing pressure in said control chamber as a function of the force exerted on the operator-actuated means by the vehicle operator;

pressure differential responsive means shiftably mounted in a second bore in said housing and responsive to the pressure differential between the control chamber and the pressure chamber to shift when the pressure in the control chamber exceeds the pressure in the pressure chamber by more than a predetermined amount; and second valve means independent of said spool valve means responsive to shifting of the pressure differential responsive means to communicate the pressure chamber with said secondary pressure source.

2. The invention of claim 1:
said pressure differential responsive means including means to prevent communication from said pressure chamber to said first bore when the secondary pressure source is communicated to the pressure chamber.

3. The invention of claim 1:
including means for venting the pressure chamber through said spool valve means upon diminution of said control pressure after said second valve means communicate said secondary pressure source to said pressure chamber.

4. The invention of claim 1:
said second valve means including normally closed valve elements controlling communication between said secondary pressure source and the pressure chamber, and the pressure differential responsive means comprises a pressure differential responsive piston having a pair of opposed faces, one of said faces being communicated to the pressure level in the pressure chamber, the other of said faces being communicated to the pressure level in said control chamber, said pressure differential responsive piston shifting to open said normally closed valve elements when the pressure level in the control chamber exceeds the pressure level in the pressure chamber by a predetermined amount.

5. The invention of claim 4; and
first passage means communicating said one face to said pressure chamber, second passage means communicating said one face to said secondary pressure source, said valve elements being located in said second passage means, and third passage means communicating said one face to said spool valve means.

6. The invention of claim 5:
said pressure differential responsive piston including means for blocking communication through said third passage means when said pressure differential responsive piston shifts to open said valve elements.

7. The invention of claim 6:
said means blocking communication through said third passage means being the outer circumferential surface of said pressure differential responsive piston.

8. The invention of claim 4:
said spool valve means being a spool valve slidably mounted in said first bore of the housing, said spool valve being shiftable in response to the fluid pressure level in said control chamber to communicate fluid pressure levels to said pressure chamber proportional to the fluid pressure levels generated in said control chamber, said pressure differential responsive piston terminating communication between said spool valve and the pressure chamber when communication between said secondary pressure source and said pressure chamber is initiated.

9. The invention of claim 8:
said secondary pressure source being a fluid pressure accumulator, and means for charging said accumulator with fluid pressure developed by said primary pressure source.

10. The invention of claim 8:
said secondary pressure source being a fluid pressure accumulator, said valve elements being responsive to a higher fluid pressure acting on said said one face of said differential pressure responsive piston than the fluid pressure level in the accumulator to permit fluid communication into the latter.

11. The invention of claim 4; and
resilient means acting on said one face of said pressure differential responsive piston to prevent the latter from operating said valve elements until the pressure differential between the pressure level in the control chamber and the pressure level in the pressure chamber exceeds a predetermined amount.

* * * * *